US006488395B2

(12) United States Patent
Woodward

(10) Patent No.: US 6,488,395 B2
(45) Date of Patent: *Dec. 3, 2002

(54) LOW PROFILE LIGHTING

(75) Inventor: Ronald Owen Woodward, Yorktown, VA (US)

(73) Assignee: Federal-Mogul World Wide, Inc., Southfield, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,775

(22) Filed: Jan. 29, 1999

(65) Prior Publication Data

US 2002/0003707 A1 Jan. 10, 2002

Related U.S. Application Data

(60) Provisional application No. 60/073,204, filed on Jan. 30, 1998.

(51) Int. Cl.[7] .............................. B60Q 1/02; F21V 7/00

(52) U.S. Cl. ........................ 362/518; 362/521; 362/297

(58) Field of Search ................................ 362/518, 517, 362/521, 522, 297, 346, 309, 332

(56) References Cited

U.S. PATENT DOCUMENTS

| | | | | | |
|---|---|---|---|---|---|
| 4,208,704 | A | * | 6/1980 | Draper | 362/518 |
| 4,704,661 | A | | 11/1987 | Kosmatka | |
| 4,755,918 | A | | 7/1988 | Pristash et al. | |
| 4,885,669 | A | * | 12/1989 | Nino | 362/522 |
| 4,918,580 | A | * | 4/1990 | Nino | 362/518 |
| 5,055,981 | A | * | 10/1991 | Nino | 362/297 |
| 5,574,328 | A | | 11/1996 | Okuchi | |
| 5,755,503 | A | * | 5/1998 | Chen et al. | 362/297 |
| 5,971,568 | A | * | 10/1999 | Kabuki | 362/346 |
| 6,007,223 | A | * | 12/1999 | Futami | 362/517 |

* cited by examiner

*Primary Examiner*—Thomas M. Sember
(74) *Attorney, Agent, or Firm*—Reising, Ethington, Barnes, Kisselle, Learman & McCulloch, P.C.

(57) ABSTRACT

A vehicle headlamp includes a reflector, a source and a lens. The headlamp is configured so that light from the source reflects from the reflector and is output from the headlamp through the lens. Concave reflector sections are formed by dividing the reflector. Each reflector section has a primary focal point and primary axis. The primary focal points of the reflector sections are coincident and the primary axes of the reflector sections are angled with respect to one another.

28 Claims, 9 Drawing Sheets

LOW PROFILE LIGHTING

CROSS REFERENCE TO RELATED APPLICATIONS

This application claims priority from Provisional Application No. 60/073,204, "LOW-PROFILE HEADLAMP," filed Jan. 30, 1998, which is incorporated by reference.

BACKGROUND OF THE INVENTION

The invention relates to low profile lighting for use, for example, as a vehicle headlamp.

In general, as shown in FIG. 23, a headlamp 900 may have a reflector 905, a lens 910, and a light source 915. The light source 915 may be located at a primary focal point 920 of the reflector 905. If the reflector 905 is parabolic in shape and the light source 915 is located at the primary focal point 920, then the light rays 925 reflected from the reflector 905 will be parallel. Therefore, the size of the lens 910 will need to be approximately equal to the cross-sectional area of the reflector 905.

FIG. 24 shows a side cross-section view of an elliptical reflector 950. The elliptical reflector 950 provides some narrowing of the beam spread in the vertical plane as indicated by the converging paths of the reflected light rays 925. The top cross-section view of FIG. 25 shows that the elliptical reflector 950 provides an even greater reduction in beam spread in the horizontal plane. Therefore, the elliptical reflector 950 allows the size of the lens 955 to be reduced in the vertical and horizontal planes.

Projection headlamp systems have been used to reduce headlamp lens size. A projection headlamp generally includes a light source, a reflector, and a single condensing lens. A light shield is positioned between the light source and the lens or between the light source and the reflector to help shape the desired far field beam pattern. Due to the high temperatures associated with projection headlamps, resulting from the concentration of all of the light in the center of a single lens, the lens generally is made of glass. Projection headlamps tend to be expensive and incompatible with conventional headlamp manufacturing techniques.

SUMMARY OF THE INVENTION

A low profile light, such as a vehicle headlamp, has a lens that is smaller in area than the lens of a conventional light and is significantly smaller in area than the reflector of the light. These configurations allow automobile and other designers to achieve aesthetic styling and improved aerodynamics. The low profile light increases design flexibility by employing a multi-section reflector for which each section can be directed individually. The low profile design techniques also may be applied to turn signals and other vehicle lights, as well as to other general lighting applications.

A low profile vehicle headlamp includes a reflector, a source and a lens. The headlamp is configured so that light from the source reflects from the reflector and is output from the headlamp through the lens. Concave reflector sections are formed by dividing the reflector. Each reflector section has a primary focal point and primary axis. The primary focal points of the reflector sections are coincident and the primary axes of the reflector sections are angled with respect to one another.

Other features and advantages will be apparent from the following description, including the drawings, and from the claims.

DESCRIPTION OF THE PREFERRED EMBODIMENTS

Figure 1:
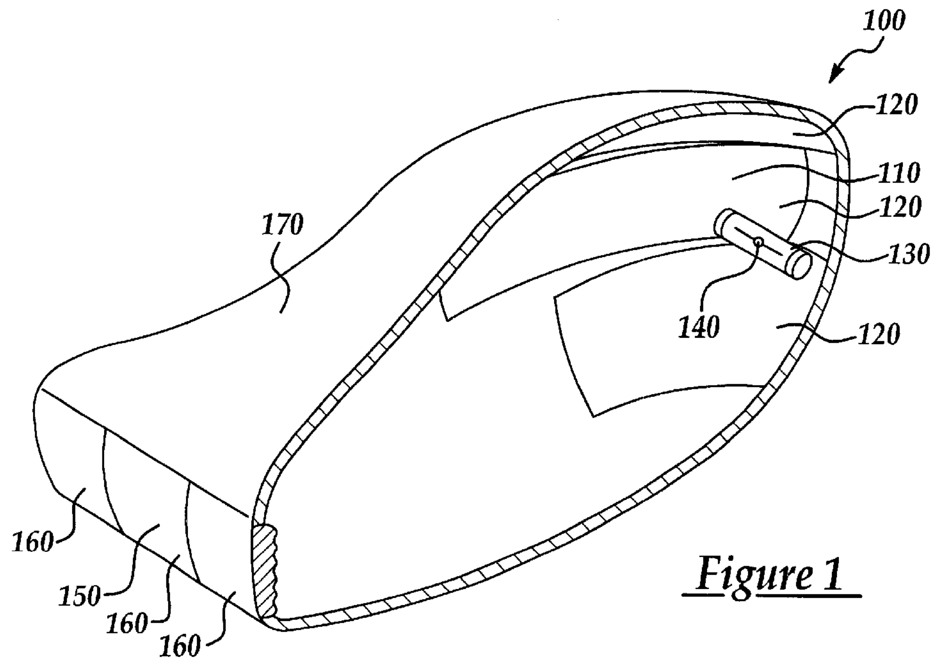
FIG. 1 is a perspective, cut-away view of a low profile headlamp.

FIG. 1 shows a low profile headlamp 100 having a reflector 110 that is divided into reflector sections 120. A source 130 is positioned near the primary focal point 140 of the reflector 110. A lens 150 that is divided into lens sections 160 is positioned at the forward end of the headlamp cavity 170. The lens 150 is significantly smaller in the vertical dimension than in the horizontal dimension. Light from the source 130 reflects from the reflector 110 and is output through the lens sections 160.

Figure 2:
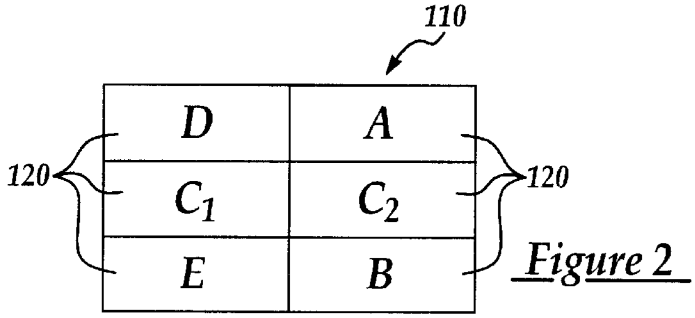
FIG. 2 is a plan view of a reflector that is divided into concave sections.

As shown in FIG. 2, a headlamp reflector 110 may, for example, be divided into three rows, each having two concave reflector sections 120. Each of the sections (A, B, $C_1$, $C_2$, D, E) may be independently rotated or repositioned about the primary focal point during the design process in order to achieve a desired lens configuration and ultimately to achieve a desired headlamp beam pattern.

Figure 3:
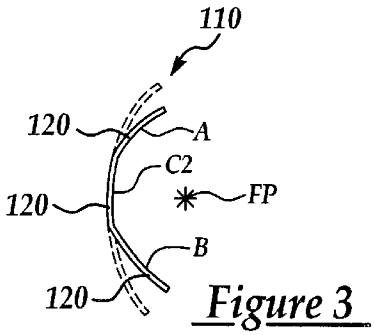
FIG. 3 is a side cross-section view of a reflector in which sections are rotated about the primary focal point.
Figure 4:
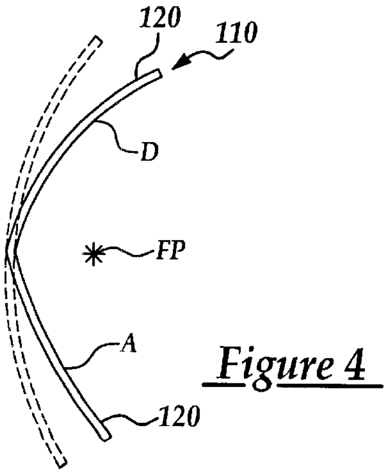
FIG. 4 is a top cross-section view of a reflector in which sections are rotated about the primary focal point.

The side sectional view of FIG. 3 shows a generally elliptical reflector in which section A in the top row and section B in the bottom row have been rotated or repositioned with respect to the primary focal point (FP). Similarly, the top sectional view of FIG. 4 shows a reflector in which the sections in the top row (A and D) have been rotated about the primary focal point (FP). Once a section is repositioned it may be separate from adjacent sections, or it may extend to connect to or overlap the adjacent sections.

Figure 5:
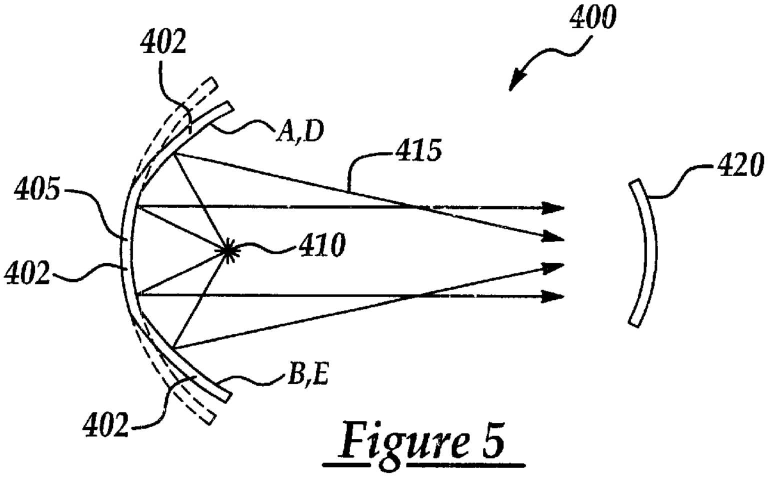
FIG. 5 is a side cross-section view of a low profile headlamp.

FIG. 5 shows a side sectional view of a headlamp 400 with an elliptical reflector 405 in which the reflector sections 402 of the top (A and D) and bottom (B and E) rows are repositioned about the primary focal point 410. The light rays 415 reflected by the reflector 405 converge in the vertical plane. Consequently, the height of the lens 420 can be significantly reduced. Although the example of FIG. 5 shows an elliptical reflector, a parabolic reflector or other shapes also may be used.

Figure 6:
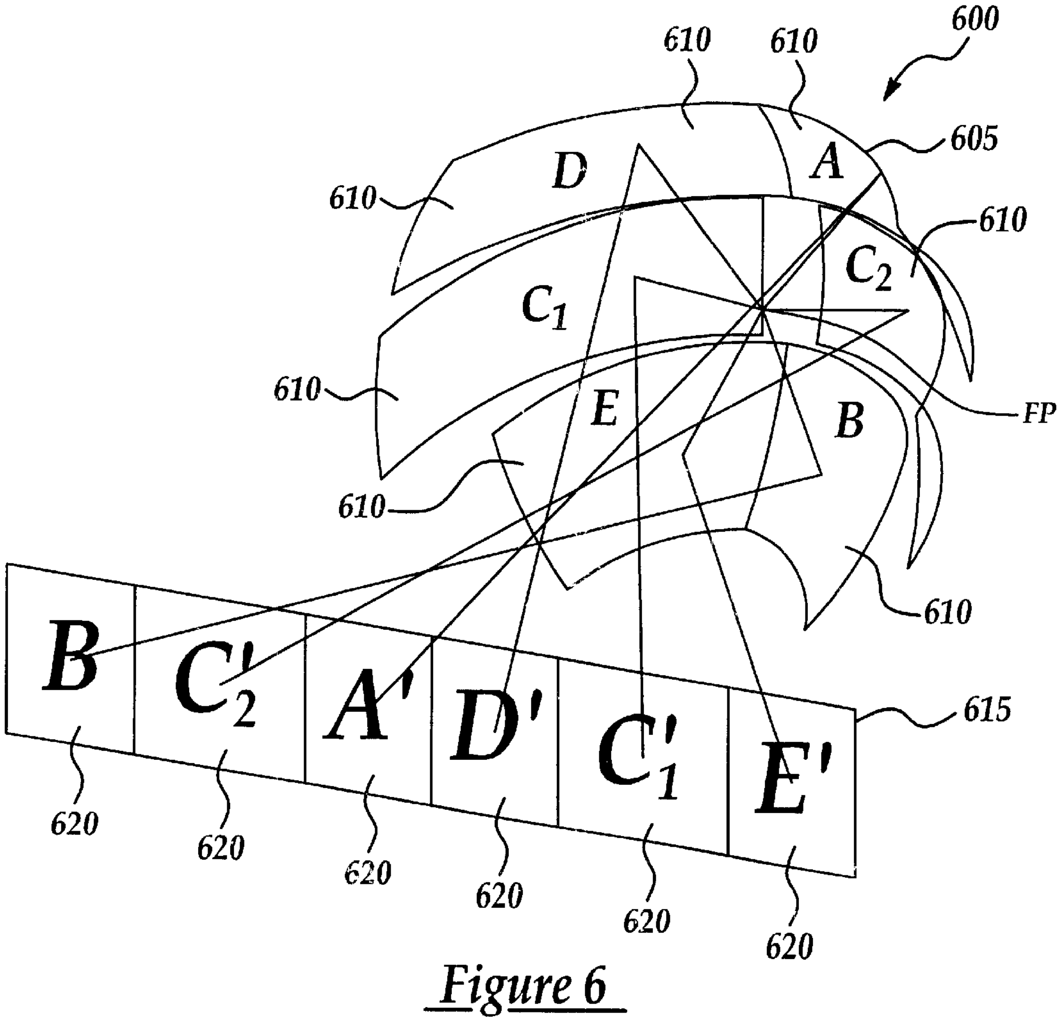
FIG. 6 is a perspective view of a low profile headlamp.

FIG. 6 shows a headlamp 600 with a reflector 605 and a lens 615. The reflector 605 is elliptical in the horizontal plane, parabolic in the vertical plane, and divided into six concave reflector sections 610. The lens 615 is divided into six lens sections 620. The concave reflector sections 610 have a common primary focal point (FP) and are positioned so that each section 610 corresponds to a lens section 620. For example, a section of the center row of the reflector, $C_1$, is positioned so that the light reflected from this section passes primarily through lens section $C_1'$. The size and location of the lens sections 620 are determined by the desired far field beam pattern and the desired form factor of the headlamp, as discussed below. The lens sections 620 may include prisms or other optics to provide further control of the beam characteristics, as further discussed below.

Figure 7:
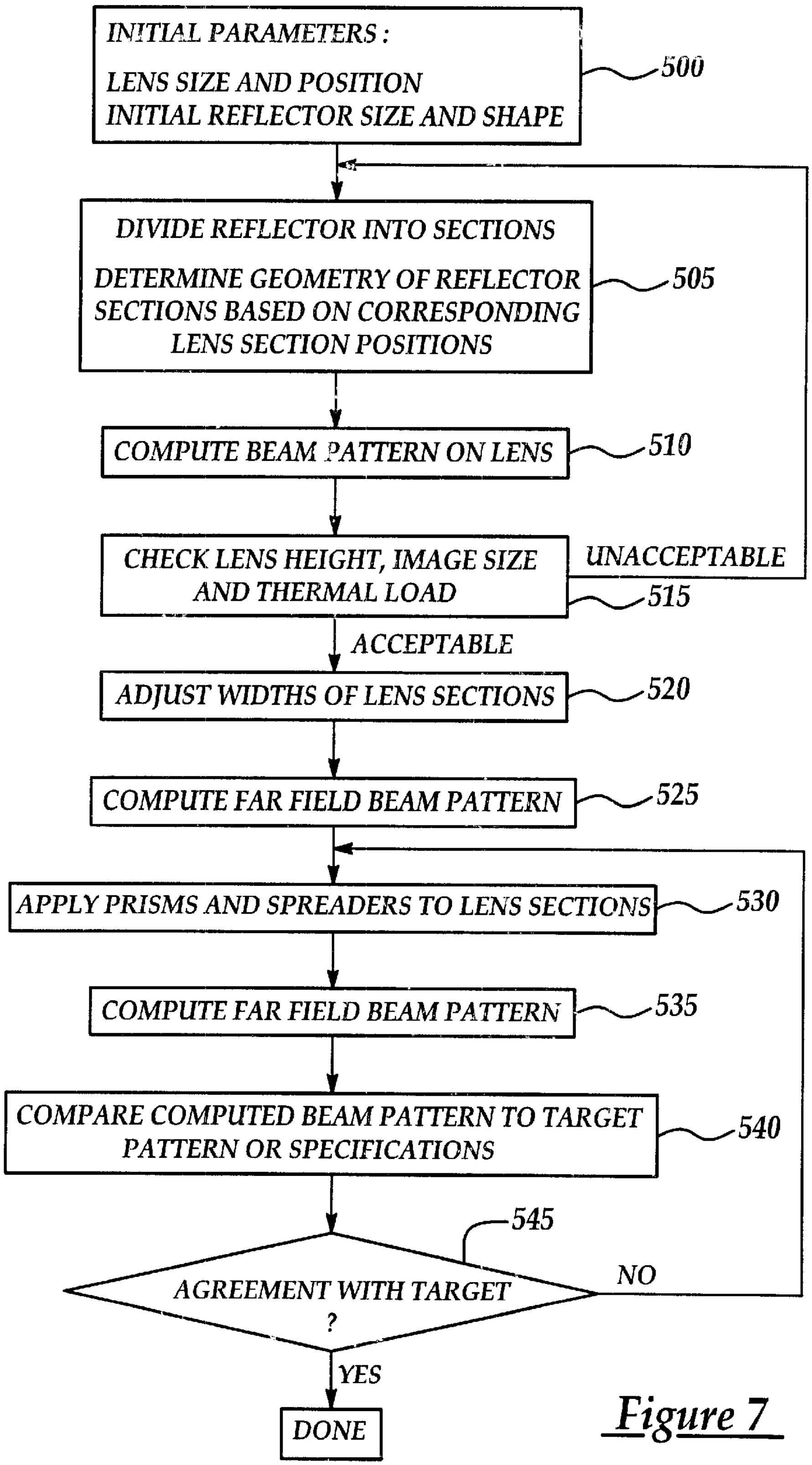
FIG. 7 is a flow chart of a design procedure for a low profile headlamp.

As shown in the flowchart FIG. 7, the low profile headlamp may be designed using an iterative process that begins with a initial size and shape for the lens and reflector (step 500). For example, the lens may be rectangular with a height that is significantly less than its width. The reflector may have a parabolic shape in the vertical plane, an elliptical shape in the horizontal plane, and a width that is approximately equal to the width of the lens. The reflector is divided into reflector sections (step 505). These initial parameters, such as the number and size of the reflector sections, may be selected based on design experience. The lens also is divided into initial lens sections (step 595). The lens sections may be adjusted following computation of the beam pattern on the lens, as discussed below.

Figure 8:
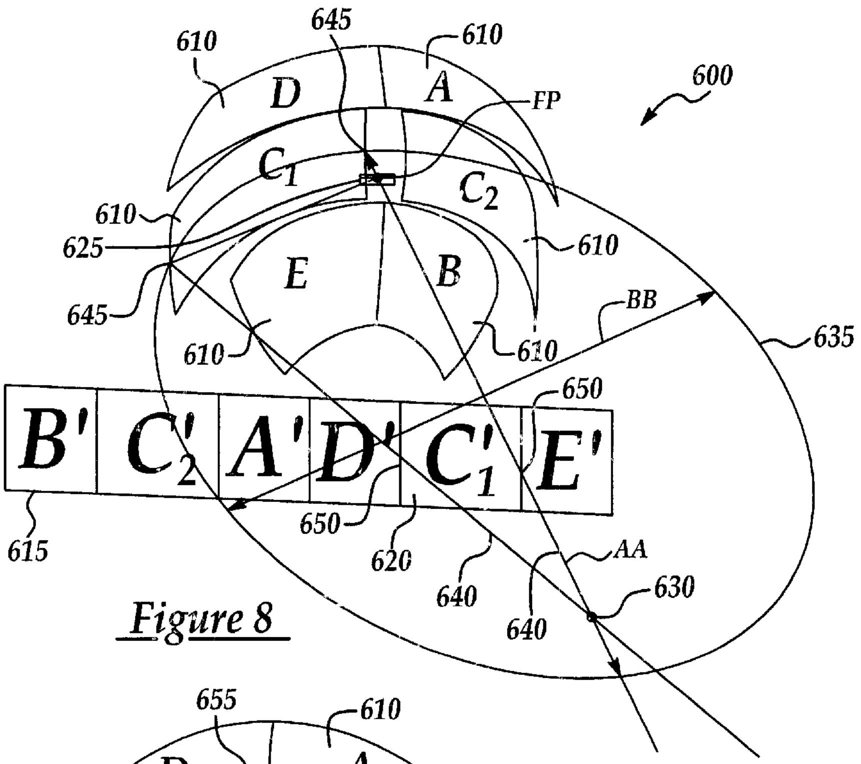
FIG. 8 is a perspective view of a low profile headlamp.

FIG. 8, for example, shows the geometry of a reflector section relative to a corresponding lens section (step 505). The light source 625 is located at or near the common primary focal point FP of the reflector sections 610. The secondary focal point 630 of the ellipse 635 defined by reflector section $C_1$ is located in front of the headlamp 600 (beyond the lens 615). In general, the position of the secondary focal point 630 depends upon the relative size and position of the reflector section 610 and the corresponding lens section 620.

The major axis of the ellipse 635 is determined by the distance from the center of the ellipse (i.e., the midpoint between the primary and secondary focal points) to the reflector. This distance is equal to one half the length of the major axis. The length of the minor axis is computed from the length of the major axis and the distance between the foci using basic geometric relationships.

In this example, the ellipse 635 defined by section $C_1$ has a major axis (primary axis) AA, having a length of 550 mm, a minor axis BB of 230 mm, and a distance between foci (FP and 630) of 500 mm. The ellipse defined by section A (not shown) has a major axis of 466 mm, a minor axis of 210 mm and a distance between foci of 416 mm. Reflector section D has similar elliptical geometry. Reflector section B has a major axis of 701 mm, a minor axis of 260 mm, and a distance between foci of 651 mm. Reflector section E has similar geometry to section B.

Figure 9:
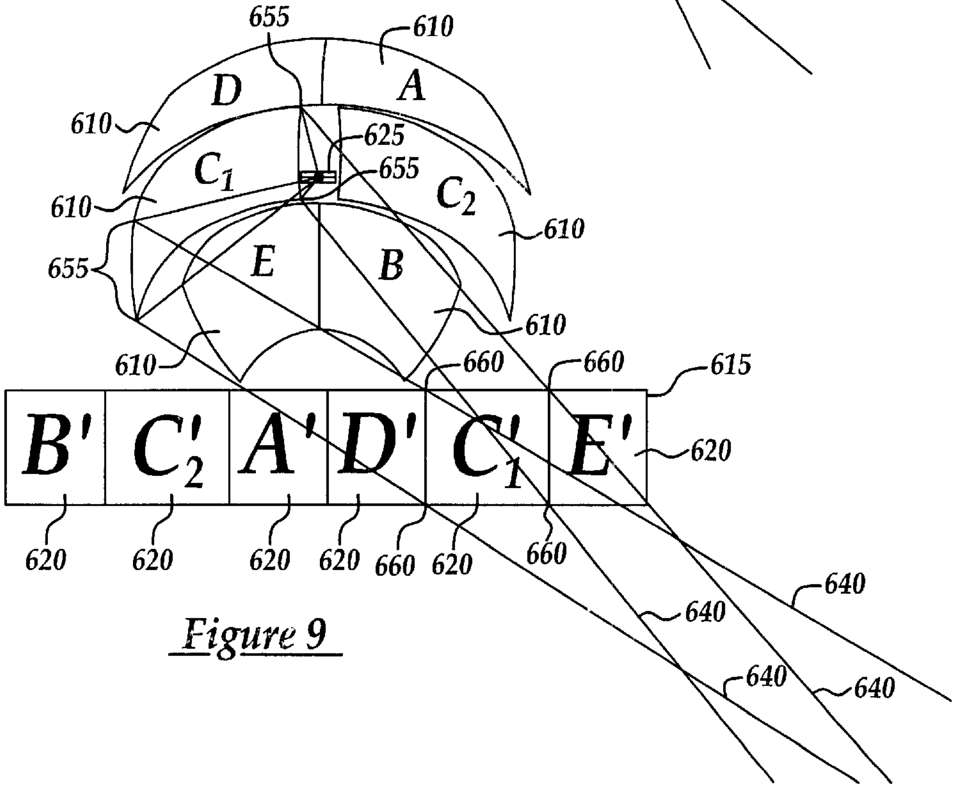
FIG. 9 is a perspective view of a low profile headlamp.

Section $C_1$ is rotated about the primary focal point FP in the vertical and horizontal planes so that light rays 640 reflected from the midpoint 645 of the sides of the reflector section 610 pass through midpoints 650 of the sides of the corresponding lens section $C_1'$. The other reflector sections 610 are rotated in a similar manner so that most of the light from each reflector section 610 passes through the corresponding lens section 620. The primary axes (e.g., AA) for the sections, which pass through the primary and secondary focal points, will generally be angled with respect to one another. In the case of a reflector that is parabolic in the horizontal plane, the geometry of the reflector sections may be defined in terms of a primary focal point, a vertex, and a primary axis passing through these points. Alternatively, as shown in FIG. 9, the reflector sections 610 may be positioned so that light rays 640 reflected from the corners 655 of the reflector sections 610 are aligned with the corners 660 of the corresponding lens sections 620.

Figure 10:
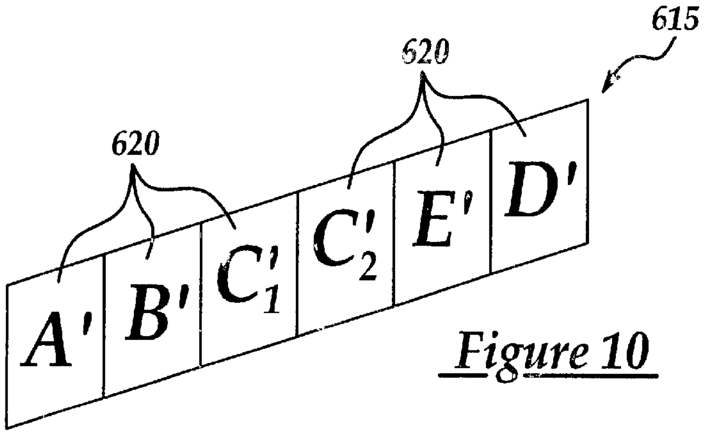
FIG. 10 is a perspective view of a row of lens sections.
Figure 11:
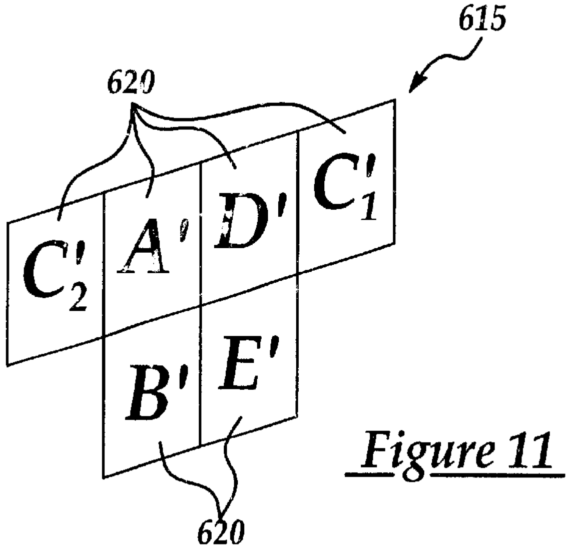
FIG. 11 is a perspective view of rows of lens sections.
Figure 12:
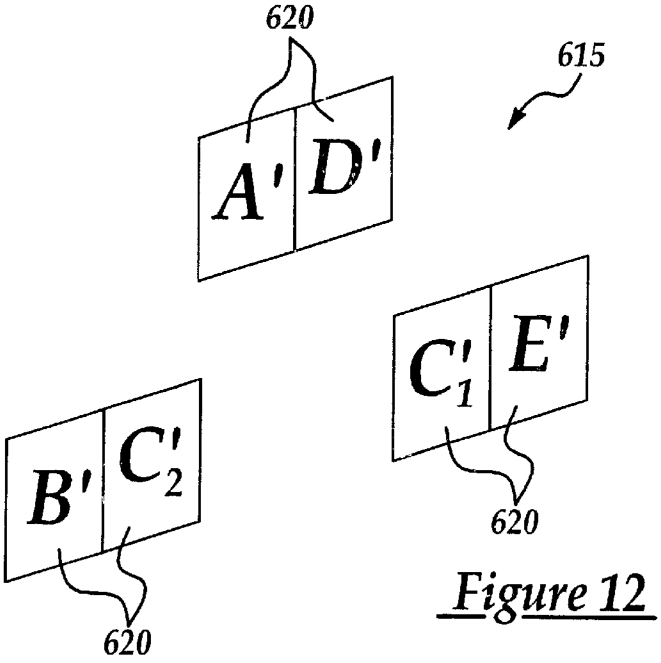
FIG. 12 is a perspective view of groups of lens sections.

As shown in FIGS. 10–12, the lens sections 620 may be arranged in a number of different configurations. For example, as shown in FIG. 10, the lens 615 may be configured so that the lens sections $C_1'$ and $C_2'$ (corresponding to reflector sections $C_1$ and $C_2$) are in the center of the lens 615. Lens sections A' and D' may be positioned on the ends of lens 615.

FIG. 11 shows a lens configuration in which lens sections B' and E' are positioned in a row below the row containing sections $C_2'$, A', D' and $C_1'$. FIG. 12 shows a lens configuration in which lens sections 620 are positioned in separate groups. The lens configuration may be determined by vehicle design considerations, such as aesthetics or aerodynamics. For example, it may be aesthetically desirable to implement the headlamps as a single row of separate lenses along the front edge of the vehicle. Previous designs have achieved a similar appearance by employing an array of small headlamp output elements. However, such an approach requires each output element to have its own light source and reflector, which increases cost and complexity.

Figure 13:
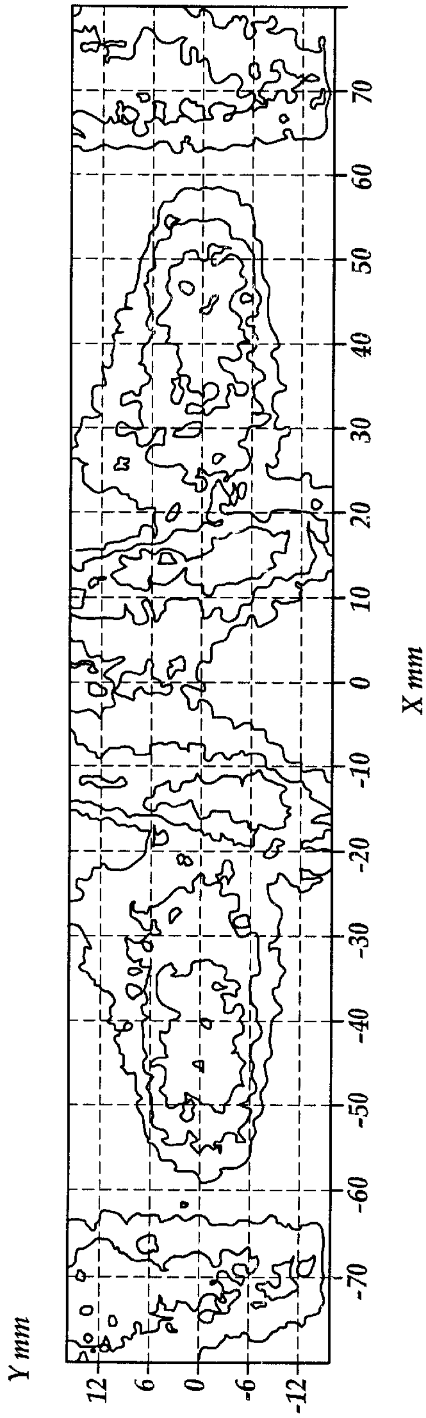
FIG. 13 is a plot of simulated beam pattern on the surface of a lens.

Once the geometry of the reflector and lens is determined (step 505), beam patterns may be computed (steps 510, 525, 535) using simulation software, such as ASAP, which is produced by Breault Research Organization, Tuscon, Ariz. FIG. 13 shows an example of the beam pattern produced on the lens (step 510). The pattern shows discrete beams peaks along the X-direction (horizontal) between approximately 0–20 mm, 20–60 mm, and 60–80 mm. Each peak corresponds to a reflector section. The computed beam pattern is used to determine thermal loading on the lens (step 515). If the light intensity at a point on the lens is greater than the thermal loading threshold, the geometry of the reflector and lens is reconfigured (step 505) to provide greater spreading of the light across the lens surface.

The computed beam pattern on the lens also may be used to adjust the width of the lens sections (step 520). For example, the lens shown in FIG. 13 might be divided at 0, 20 and 60 mm so that these beam peaks can be independently adjusted to form the desired composite beam pattern, as discussed below. The computed beam pattern also shows whether light is concentrated within the boundaries of the lens (step 515) without significant spillover or whether the lens size must be increased (step 505).

Figure 14:
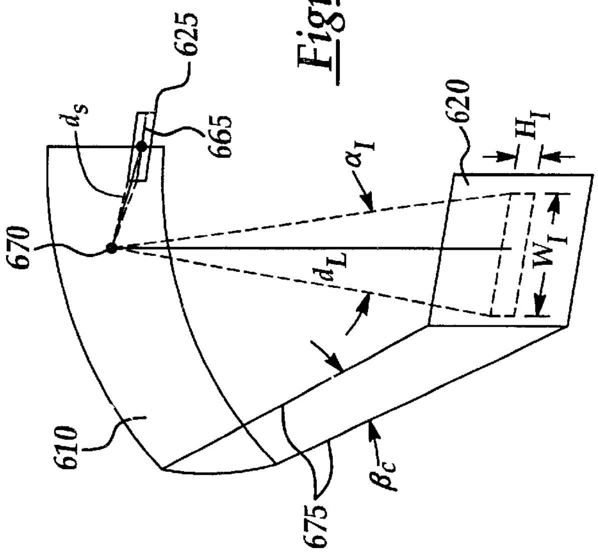
FIG. 14 is a diagram of a concave reflector section, a source and a lens section.

Alternatively, a minimum lens section size may be determined by computing a source image width and height based on the geometry of the reflector and lens. FIG. 14 shows a concave reflector section 610, a light source 625 having a filament 665 and a corresponding lens section 620. The source 625 may have an axial filament that extends from a bulb base in a direction toward the front of the vehicle, as in an incandescent source, or a transverse filament that extends in the direction transverse to the forward direction, as in a halogen source. The minimum size is determined for the corresponding lens section 620 based on the projected size of the filament 665 and a computed magnification factor.

The distance from the filament to a reflection point 670, $d_s$, on the surface of the reflector section is determined. A number of representative reflection points may be selected, since the magnification factor varies across the reflector. A light ray from the source is reflected from the reflection point 670 and travels a distance, $d_L$, to the lens. The filament has a projected width, $W_p$, and a projected height, $H_p$, in the direction orthogonal to the line between the source and the reflection point 670. The magnification factor, M, for the reflection point is:

$$M=d_L/d_s$$

The image width, $W_I$, of the filament projected upon the lens section is:

$$W_I=M\cdot W_p$$

The image height, $H_I$, of the filament projected upon the lens section is:

$$H_I=M\cdot H_p$$

The lens section generally should be at least as large as the image size. For example, if a filament has a projected width of 5 mm and the reflector has a magnification factor of 2, the lens section must be at least 10 mm wide.

The image height and width may be expressed as angles measured with respect to the reflection point 670. The angular image width, $\alpha_I$, is:

$$\alpha_I=2\tan^{-1}(W_I/2d_L)$$

Similarly, the angular image height, $\beta_I$, is:

$$\beta_I=2\tan^{-1}(H_I/2d_L)$$

Figure 22:
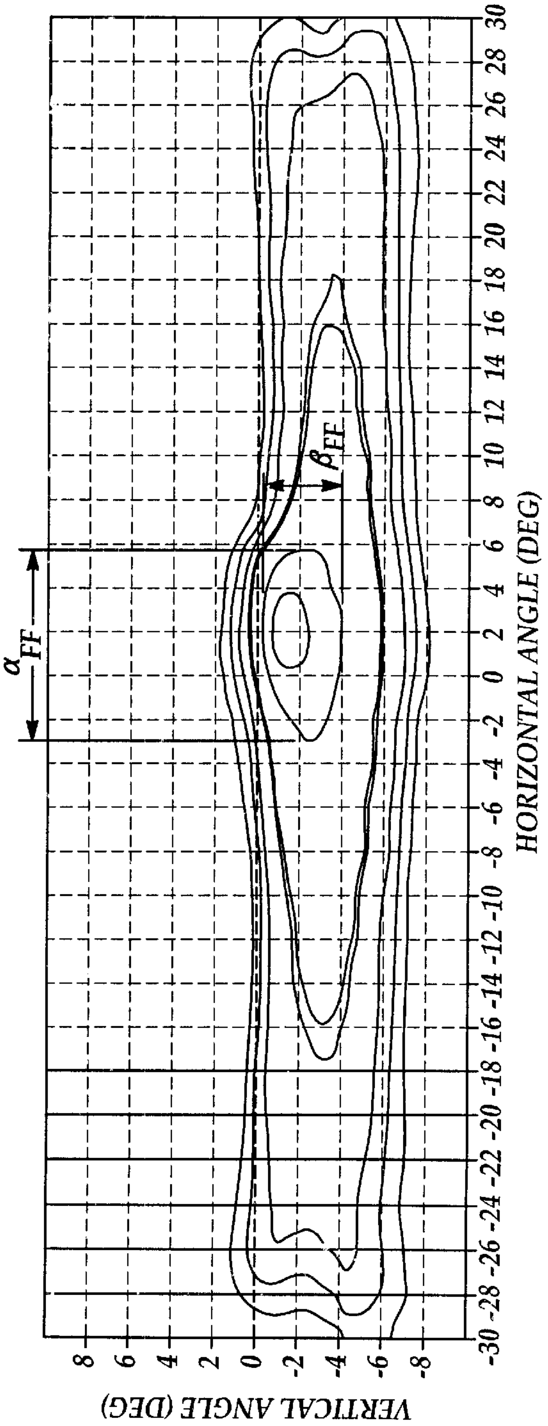
FIG. 22 is a plot of a typical far field headlamp beam pattern.
Figure 23:
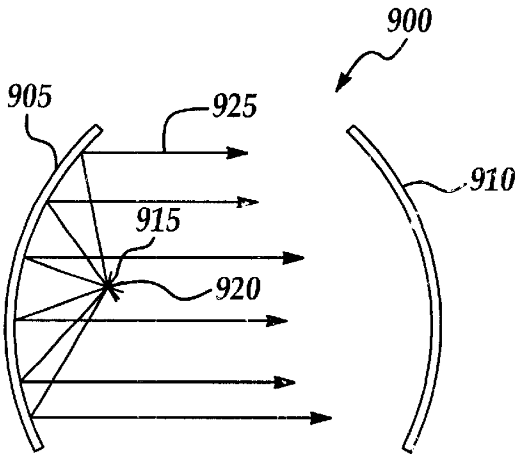
FIG. 23 is a side cross-section view of a parabolic reflector.
Figure 24:
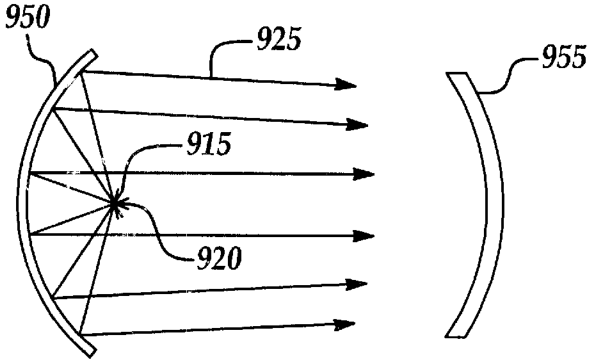
FIG. 24 is a side cross-section view of an elliptical reflector.
Figure 25:
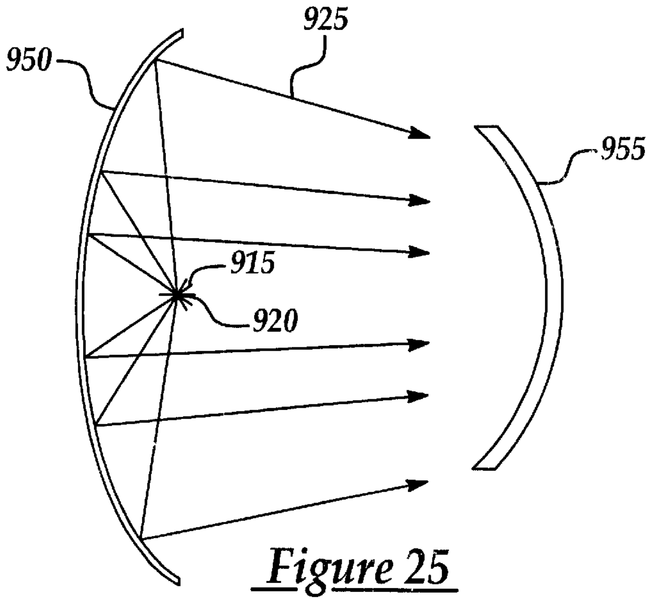
FIG. 25 is a top cross-section view of an elliptical reflector.

In addition to evaluating lens section size based on computed beam patterns and image size calculations, as described above, an initial estimate of the relationship between lens section size and far field beam pattern intensity is performed. In general, the desired far field headlamp beam pattern will have a hot spot of high intensity light near its center. The angular size of the hot spot in the beam pattern is used to determine whether the lens section configuration is sufficient to produce the desired light intensity in the hot spot. For example, the hot spot in the far field headlamp pattern of FIG. 22 is approximately 10° in width ($\alpha_{FF}$) and 3.5° in height ($\beta_{FF}$).

Referring again to FIG. 14, a height compression angle, $\beta_c$, is defined between light rays 675 extending from corners along a side of the reflector section 610 to the corresponding corners of the lens section 620. Similarly, a width compression angle, $\alpha_c$, is defined between light rays (not shown) extending from corners along the top or bottom of the reflector section to corresponding corners of the lens section. The compression angles are used to determine whether the lens section is too large to generate sufficient intensity in the hot spot. If so, the lens section is divided into rectangular facets. The facets may be independently adjusted with corrective optics, as described below.

The number of facets may be determined as follows. The difference between the angular size of the hot spot and the angular image size (i.e., the allowable compression angle) is:

$$\Delta\alpha=\alpha_{FF}-\alpha_I \text{ (Width)}$$

$$\Delta\beta=\beta_{FF}-\beta_I \text{ (height)}$$

The minimum number of facets (i.e., rows) in the vertical dimension is:

$N_{FV}=\beta_c/\Delta\beta$ (rounded up to nearest integer)

Similarly, the number of facets (i.e., columns) in the horizontal dimension is:

$N_{FH}=\alpha_c/\Delta\alpha$ (rounded up to nearest integer)

For example, if the vertical compression angle, $\beta_c$, is 2°, the angular height of the hot spot, $\beta_{FF}$, is 3.5° and the angular image height, $\beta_I$, is 2°, then the difference or allowable compression angle, $\Delta\beta$, is 1.5°. The number of facets in the vertical dimension is 2/1.5 or 1.333, which is rounded up to 2. Therefore, the lens sections would incorporate two rows of facets.

Once an acceptable beam pattern is achieved on the surface of the lens and lens section size is evaluated, a far field beam pattern is computed (step 525). In general, each reflector section and corresponding lens section produces a beam in the far field. The beams are adjusted in an iterative process (steps 530, 535, 540, 545) using corrective optics in the lens sections, such as prisms and beam spreaders, until a desired composite beam pattern is achieved, as discussed below.

Figure 15:
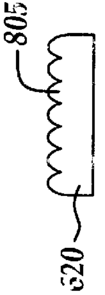
FIG. 15 is a perspective view of a lens section with a beam spreader.
Figure 16:
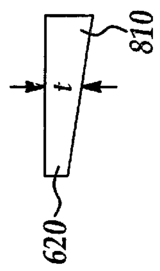
FIG. 16 is a perspective view of a lens section with a prism.
Figure 17:
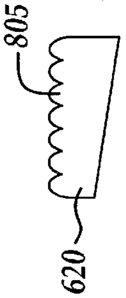
FIG. 17 is a perspective view of a lens section with a prism and a beam spreader.

The elliptical shape of the reflector and the rotation of reflector sections tends to broaden or spread the beams. As shown in FIG. 15, additional beam spreading (step 530) is achieved using cylindrical ridges 805 formed on the surface of the lens section 620. As shown in FIG. 16, the relative beam positions are changed (step 530) by a prism 810 that is formed in the lens section 620 and changes the direction of the beam. The prism 810 is formed, for example, by varying the thickness, t, of the lens section 620 across its surface. As shown in FIG. 17, lens sections 620 may include both beam spreading ridges 805 and a prism 810.

Figure 18:
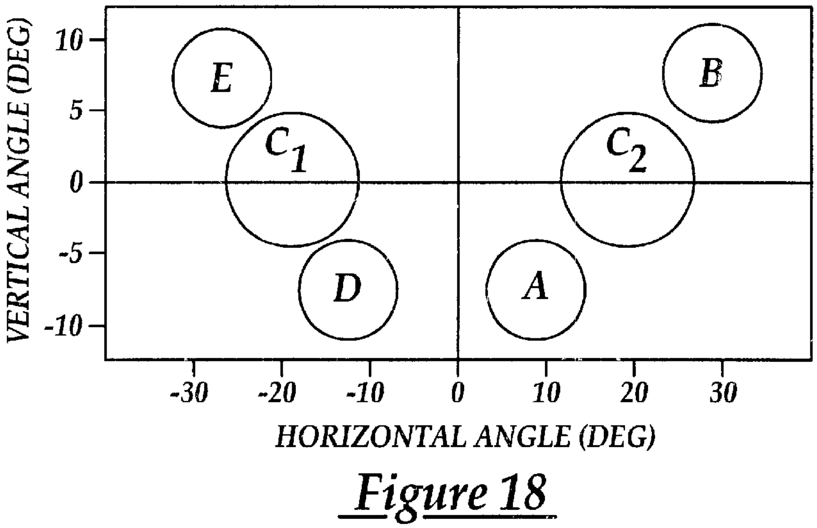
FIG. 18 is a plot of a far field beam pattern without correcting optics in the lens.
Figure 19:
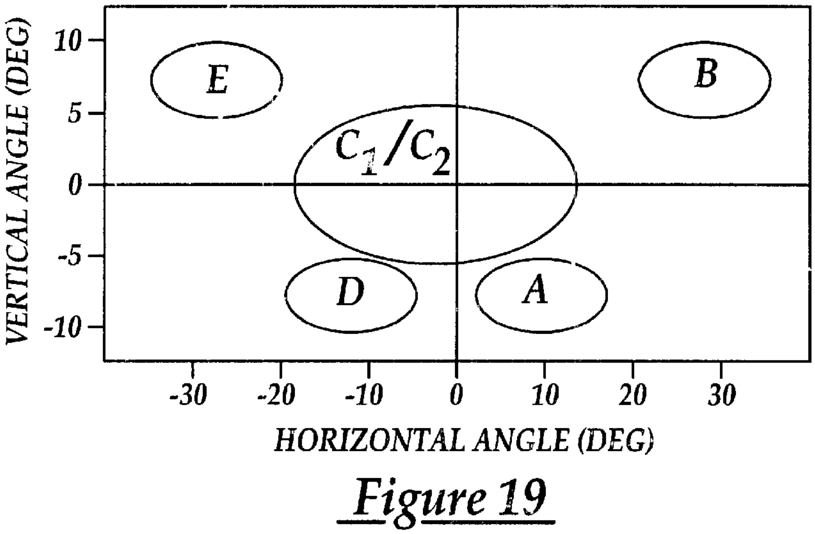
FIG. 19 is a plot of a far field beam pattern with a prism in lens sections $C_1$' and $C_2$'.
Figure 20:
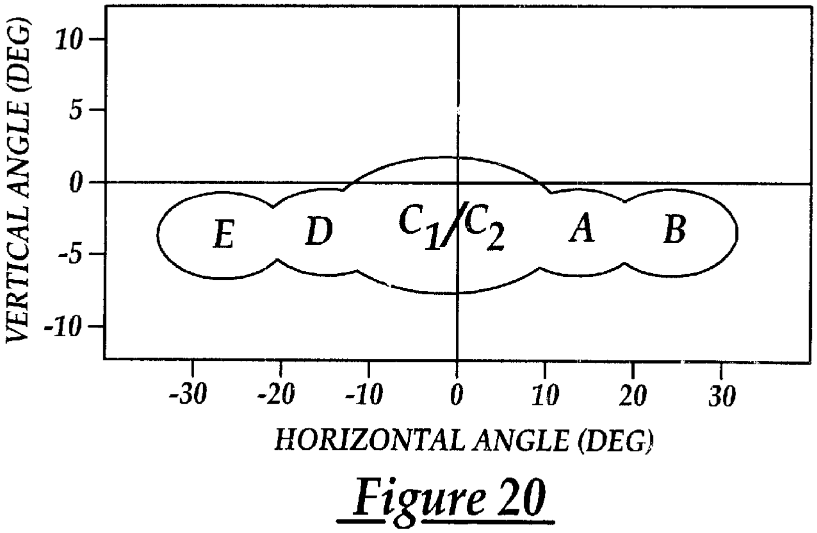
FIG. 20 is a plot of a far field beam pattern with prisms in all of the lens sections.

FIGS. 18–20 show an example of adjusting a far field beam pattern using corrective optics in the lens sections (steps 525, 530, 535 and 545). FIG. 18 is an uncorrected far field beam pattern (step 525). In general, each reflector section and corresponding lens sections generates a beam in the far field. The beams corresponding to the center row of reflector sections ($C_1$ and $C_2$) are used to produce the hot spot at the center of the composite beam pattern. These reflector sections may be made larger than the other reflector sections to produce higher intensity beams in the far field. Accordingly, as shown in FIG. 19, beams $C_1$ and $C_2$ are directed toward the center of the pattern in the horizontal plane using prisms (step 530).

As shown in FIG. 20, a new beam pattern is computed following the adjustment (step 535). Further adjustment may be required to achieve the desired beam pattern, such as by further redirection of the beams or beam spreading. In this example, additional prisms are used on the lens sections to direct the beams below 0° in the vertical plane to illuminate the road surface. However, in practice, beams may be redirected in any direction necessary to achieve a desired beam pattern. FIG. 20 shows the resulting composite beam pattern following adjustment. This composite pattern is compared to a target headlamp beam pattern or specifications (steps 540 and 545).

Figure 21:
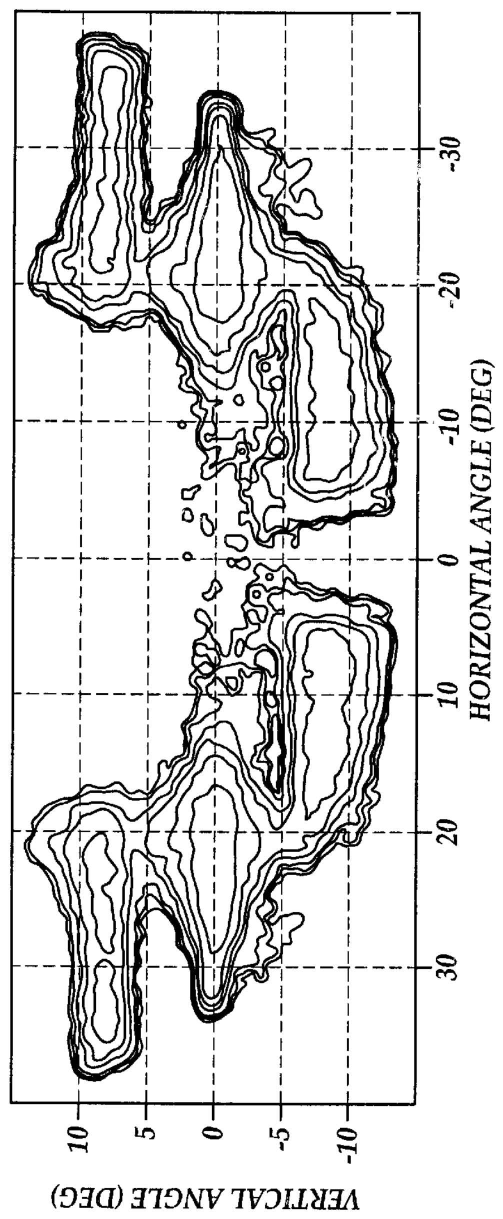
FIG. 21 is a simulated far field beam pattern.

FIG. 21 shows an example of a far field beam pattern (step 525) simulated using the computer software, ASAP. FIG. 22 shows a typical headlamp far field beam pattern. As described above, the corrected beam pattern resulting from the iterative design process may be compared to such a target beam pattern or to headlamp pattern specifications (steps 540 and 545).

The design process described above also may be used to produce low profile configurations of other types of vehicle lamps, such as turn signals and tail lights. In addition, lamps having this low profile configuration may be used in any lighting application, such as, for example, airports, building interiors and exteriors, athletic fields, stadia, streets, and communication towers. In such applications, the low profile lens configuration may be desirable due to practical, aesthetic, or other considerations.

Other embodiments are within the scope of the following claims.

What is claimed is:

1. In a vehicle headlamp comprising a reflector, a source and a lens, the headlamp configured so that light from the source reflects from the reflector and is output through the lens, the improvement comprising:

said reflector including a plurality of concave reflector sections, each of which has a primary focal point and a secondary focal point, wherein the primary focal points of the reflector sections are coincident and the secondary focal points of the reflector sections are located beyond the lens, wherein each of the reflector sections is oriented to reflect light from the source in a direction toward the lens such that the reflected light from the plurality of reflector sections converges in a vertical direction as it travels towards the lens, and wherein the lens has a height that is less than the height of the reflector and has lens sections that each include one or more individual lens elements which redirect at least some of the light received from the reflector, with each of said lens sections corresponding to a different one of said reflector sections.

2. The vehicle headlamp of claim 1, wherein each of said lens sections is at least as large as an image of the source reflected thereon by a corresponding one of said reflector sections.

3. The vehicle headlamp of claim 1, wherein the primary axes of said reflector sections are angled so that a significant portion of the light reflected from each of said reflector sections is output through a corresponding one of said lens sections.

4. The vehicle headlamp of claim 3, wherein the lens elements each comprise a beam spreader formed on a surface of the corresponding lens section.

5. The vehicle headlamp of claim 3, wherein the lens elements each comprise a prism formed on a surface of the corresponding lens section.

6. The vehicle headlamp of claim 3, wherein said lens sections form a single horizontal row.

7. The vehicle headlamp of claim 3, wherein at least one of said lens sections forms a first lens section group that is non-contiguous with a second lens section group.

8. The vehicle headlamp of claim 3, wherein each of said lens sections is non-contiguous with every other lens section of said lens sections.

9. In a lamp comprising a reflector, a source and a lens, the lamp configured so that light from the source reflects from the reflector and is output through the lens, the improvement comprising:

said reflector including a plurality of concave reflector sections, each of which has a primary focal point and a secondary focal point, wherein the primary focal points of the reflector sections are coincident and the secondary focal points of the reflector sections are located beyond the lens, wherein each of the reflector sections is oriented to reflect light from the source in a direction toward the lens such that the reflected light from the plurality of reflector sections converges in a vertical direction as it travels towards the lens, and wherein the lens has a height that is less than the height of the reflector and has lens sections that each include one or more individual lens elements which redirect at least some of the light received from the reflector, with each of said lens sections corresponding to a different one of said reflector sections.

10. The lamp of claim 9, wherein each of said lens sections is at least as large as an image of the source reflected thereon by a corresponding one of said reflector sections.

11. The lamp of claim 9, wherein the primary axes of said reflector sections are angled so that a significant portion of the light reflected from each of said reflector sections is output through a corresponding one of said lens sections.

12. The lamp of claim 11, wherein the lens elements each comprise a beam spreader formed on a surface of the corresponding lens section.

13. The lamp of claim 11, wherein the lens elements each comprise a prism formed on a surface of the corresponding lens section.

14. The lamp of claim 11, wherein said lens sections form a single horizontal row.

15. The lamp of claim 11, wherein at least one of said lens sections forms a first lens section group that is non-contiguous with a second lens section group.

16. The lamp of claim 11, wherein each of said lens sections is non-contiguous with every other lens section of said lens sections.

17. A low profile lamp, comprising:

a first reflector section having a first primary focal point and a first primary axis, a second reflector section having a second primary focal point and a second primary axis, the second primary focal point being coincident with the first primary focal point, and the second primary axis forming a non-zero angle with the first primary axis, a light source positioned near the coincident first and second primary focal points, the light source configured so that light from the light source is reflected from the first and second reflector sections, a first lens section positioned to receive light reflected from the first reflector section, and a second lens section positioned to receive light reflected from the second reflector section, said lens sections each having one or more individual lens elements that redirect at least some of the light received from the reflector;

wherein the first and second reflector sections are vertically adjacent each other with the non-zero angle including a non-zero vertical component and a non-zero horizontal component, and wherein the first and second lens sections are horizontally adjacent each other, whereby the first reflector section provides horizontal and vertical redirection of the light relative to the redirection of the light off the second reflector section.

18. The low profile lamp of claim 17, wherein the first reflector section forms an ellipse, the first primary focal point forming a focus of the ellipse and the first primary axis forming a major axis of the ellipse.

19. The low profile lamp of claim 17, wherein light reflected from a midpoint of a side of the first reflector section passes through a midpoint of a corresponding side of the first lens section.

20. The low profile lamp of claim 17, wherein light reflected from a corner the first reflector section passes through a corresponding corner of the first lens section.

21. A low profile vehicle headlamp, comprising:

a light source;

a lens; and a reflector positioned to reflect light from the source towards the lens;

wherein the reflector has vertically offset reflector sections and the lens has horizontally offset lens sections, with the lens sections each including a surface having one or more individual lens elements that redirect at least some of the light received from the reflector sections; and wherein the reflector sections are oriented relative to the light source such that at least some of the vertically offset reflector sections reflect light to the horizontally offset lens sections with the light received by the lens sections being redirected by the individual lens elements to form a low profile beam pattern that is emitted from the horizontally offset lens sections.

22. The low profile vehicle headlamp of claim 21, wherein each of the reflector sections has a primary focal point located proximate the light source, and at least some of the lens sections are ellipsoidal in the horizontal direction.

23. The low profile vehicle headlamp of claim 22, wherein one or more of the ellipsoidal reflector sections have a secondary focal point with the lens being located between that ellipsoidal reflector section and its secondary focal point.

24. The low profile vehicle headlamp of claim 22, wherein at least one of the ellipsoidal reflector sections are parabolic in the vertical direction.

25. The low profile vehicle headlamp of claim 22, wherein the individual lens elements are prismatic lens elements whereby the lens has a plurality of individual prismatic lens elements extending from the surface of the lens.

26. A low profile vehicle headlamp, comprising:

a light source;

a lens having a plurality of different lens sections, each of which includes at least one lens element on a surface of the lens section; and a reflector positioned to reflect light from the source towards the lens, the reflector including a first group of concave reflector sections spaced horizontally from each other and a second group of concave reflector sections spaced horizontally from each other, with each of the reflector sections from the second group being offset vertically from one or more of the reflector sections of the first group;

wherein the reflector sections from the first group are each oriented relative to the light source to reflect light to one or more lens sections within a first group of said lens sections that are each located horizontally along the lens relative to each other; and wherein at least two of the reflector sections from the second group are oriented relative to the light source to reflect light to two or more of the lens sections within the first group of said lens sections, whereby at least some of the vertically offset reflector sections with the second group reflect light to horizontally offset locations on the lens.

27. The low profile vehicle headlamp of claim 26, wherein each of the reflector sections from the first and second groups of reflector sections is mapped to a different lens section, whereby each of the lens sections receives light reflected primarily from only one of the reflector sections.

28. The low profile vehicle headlamp of claim 27, wherein each of the reflector sections within the first and second groups of reflector sections is mapped to a different one of the lens sections within the first group of lens sections.

* * * * *

UNITED STATES PATENT AND TRADEMARK OFFICE

CERTIFICATE OF CORRECTION

PATENT NO. : 6,488,395 B2

DATED : December 3, 2002

INVENTOR(S) : Ronald Owen Woodward

It is certified that error appears in the above-identified patent and that said Letters Patent is hereby corrected as shown below:

Column 3,
Line 44, after “sections” delete “(step 595)” and insert therein -- (step 505) --.

Column 9,
Line 8, after “corner” insert therein -- of --.

Signed and Sealed this

Fifteenth Day of July, 2003

JAMES E. ROGAN
*Director of the United States Patent and Trademark Office*